(12) United States Patent
Ahn (10) Patent No.: US 11,225,295 B2
(45) Date of Patent: Jan. 18, 2022

(54) REAR CROSS MEMBER FOR VEHICLE

(71) Applicant: HYUNDAI MOBIS CO., LTD., Seoul (KR)

(72) Inventor: Hee Tae Ahn, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 175 days.

(21) Appl. No.: 16/585,734

(22) Filed: Sep. 27, 2019

(65) Prior Publication Data

US 2020/0102030 A1    Apr. 2, 2020

(30) Foreign Application Priority Data

Sep. 27, 2018 (KR) .................. 10-2018-0114662

(51) Int. Cl.
| | | |
|---|---|---|
| B62D 65/02 | (2006.01) | |
| B62D 21/15 | (2006.01) | |
| B62D 21/06 | (2006.01) | |
| B62D 21/11 | (2006.01) | |

(52) U.S. Cl.
CPC .......... B62D 65/024 (2013.01); B62D 21/06 (2013.01); B62D 21/155 (2013.01); B62D 21/11 (2013.01)

(58) Field of Classification Search
CPC .... B62D 65/024; B62D 21/06; B62D 21/155; B62D 21/11
USPC ...................................... 296/203.04
See application file for complete search history.

(56) References Cited

U.S. PATENT DOCUMENTS 9,764,764 B2 * 9/2017 Irie ...................... B62D 65/024
2016/0347367 A1 * 12/2016 Yokota ................... B62D 21/08

* cited by examiner

*Primary Examiner* — D Glenn Dayoan
*Assistant Examiner* — Dana D Ivey
(74) *Attorney, Agent, or Firm* — Morgan, Lewis & Bockius LLP (57) ABSTRACT

A rear cross member for a vehicle includes: an upper plate including an upper body, and upper side parts that are formed to extend from opposite ends of the upper body; a lower plate including a lower body that is coupled with the upper body, and lower side parts that are formed to extend from opposite ends of the lower body and are coupled with the upper side parts; and a front panel connected to the upper and lower plates.

16 Claims, 8 Drawing Sheets

REAR CROSS MEMBER FOR VEHICLE

CROSS-REFERENCE TO RELATED APPLICATION

The present application claims priority under 35 U.S.C. § 119(a) to Korean Patent Application No. 10-2018-0114662 filed on Sep. 27, 2018 in the Korean Intellectual Property Office, which is incorporated herein by reference in its entirety.

BACKGROUND

1. Technical Field

Embodiments of the present disclosure relate to a rear cross member for a vehicle, and more particularly, to a rear cross member for a vehicle which is improved in assemblability and durability.

2. Related Art

A rear cross member for a vehicle in the related art is made up of a front panel, a rear panel, and a pair of side members connecting the front panel and the rear panel. Joints of the front panel and the side members are joined by welding. Joints of the side members and the rear panel are also joined by welding. An assist arm bracket is located at a lower end of the front panel, and is joined by welding.

The front panel is made up of an upper plate and a lower plate, and the upper and lower plates of the front panel are joined by welding. Each side member is made up of an upper plate and a lower plate, and the upper and lower plates of each side member are joined by welding. The rear panel is made up of a front-side panel and a rear-side panel, and the front-side and rear-side panels of the rear panel are joined by welding.

A front body mount has the front panel and a bush cup welded by welding, and a rear body mount has the side members and bush cups welded by welding. Thus, since each component is a separate object and is joined by welding, there is a problem in that a structure is complicated and cracks occur in a weld zone when a load is applied thereto. Consequently, a need to improve this problem is requested.

SUMMARY

Various embodiments have been made in view of the above problem, and are directed to a rear cross member for a vehicle which is improved in assemblability and durability.

In an embodiment, a rear cross member for a vehicle includes: an upper plate including an upper body, and upper side parts that are formed to extend from opposite ends of the upper body; a lower plate including a lower body that is coupled with the upper body, and lower side parts that are formed to extend from opposite ends of the lower body and are coupled with the upper side parts; and a front panel connected to the upper and lower plates.

In the embodiment, the upper side parts may include a first upper side part that is formed to extend forward and backward from one end of the upper body, and a second upper side part that is formed to extend forward and backward from the other end of the upper body, and the lower side parts may include a first lower side part that is coupled to the first upper side part and is formed to extend forward and backward from one end of the lower body, and a second lower side part that is coupled to the second upper side part and is formed to extend forward and backward from the other end of the lower body.

In the embodiment, the first upper side part may include a first upper front side part that is formed to extend forward from the upper body, and a first upper rear side part that is formed to extend backward from the upper body, and the first lower side part may include a first lower front side part that is coupled to the first upper front side part and is formed to extend forward from the lower body, and a first lower rear side part that is coupled to the first upper rear side part and is formed to extend backward from the lower body.

In the embodiment, the first upper front side part may include a first upper front protrusion that is formed to extend forward from the upper body, and a first upper front outer part that is formed to extend from the first upper front protrusion in a direction apart from the second upper side part, and the first lower front side part may include a first lower front protrusion that is coupled to the first upper front protrusion and is formed to extend forward from the lower body, and a first lower front outer part that is coupled to the first upper front outer part and is formed to extend from the first lower front protrusion in a direction apart from the second lower side part.

In the embodiment, the first upper rear side part may be formed to extend from the upper body in the direction apart from the second upper side part, and the first lower rear side part may be formed to extend from the lower body in the direction apart from the second lower side part.

In the embodiment, the second upper side part may include a second upper front side part that is formed to extend forward from the upper body, and a second upper rear side part that is formed to extend backward from the upper body, and the second lower side part may include a second lower front side part that is coupled to the second upper front side part and is formed to extend forward from the lower body, and a second lower rear side part that is coupled to the second upper rear side part and is formed to extend backward from the lower body.

In the embodiment, the second upper front side part may include a second upper front protrusion that is formed to extend forward from the upper body, and a second upper front outer part that is formed to extend from the second upper front protrusion in a direction apart from the first upper side part, and the second lower front side part may include a second lower front protrusion that is coupled to the second upper front protrusion and is formed to extend forward from the lower body, and a second lower front outer part that is coupled to the second upper front outer part and is formed to extend from the second lower front protrusion in a direction apart from the first lower side part.

In the embodiment, the second upper rear side part may be formed to extend from the upper body in the direction apart from the first upper side part, and the second lower rear side part may be formed to extend from the lower body in the direction apart from the first lower side part.

In the embodiment, the front panel may include a first front panel that is coupled to fronts of the upper and lower side parts, and a second front panel that is coupled to the first front panel and is coupled to the upper and lower side parts.

In the embodiment, the lower plate may be coupled on a lower side of the upper plate, and the second front panel may be coupled in front of the first front panel.

In the embodiment, the first and second front panels may be concavely formed to house the upper and lower side parts, and may include front panel fasteners coupled with the upper and lower side parts.

In the embodiment, the upper and lower side parts may communicate with each other, and bosses may be press-fitted into the upper and lower side parts.

In the embodiment, the upper and lower side parts may be formed to come into contact with outer surfaces of the bosses by burring.

In the embodiment, each boss may include, a central shaft, an outer support that is disposed apart from the central shaft, and an absorber that is interposed between the central shaft and the outer support and absorbs shocks transmitted from the central shaft or the outer support.

In the embodiment, the central shaft and the outer support may be formed of a steel material, and the absorber may be formed of an elastically deformable material.

According to the rear cross member for a vehicle of the present disclosure, the number of coupling components of the rear cross member for a vehicle is reduced, so that a process can be simplified, and productivity can be improved.

Further, according to the present disclosure, the upper plate, the lower plate, and the front panel form an integrated structure, so that durability can be improved compared to the case where they form a multi-component structure.

DETAILED DESCRIPTION

Hereinafter, a rear cross member for a vehicle will be described below with reference to the accompanying drawings through various examples of embodiments. In the drawings, thicknesses of certain lines, sizes of components, etc. may be exaggerated for clarity and convenience of description.

Further, technical terms, as will be mentioned below, are terms defined in consideration of functions thereof in the present disclosure, which may be varied according to the intention of a user, practice, or the like. Therefore, the terms should be defined on the basis of the contents of this specification.

Figure 1:
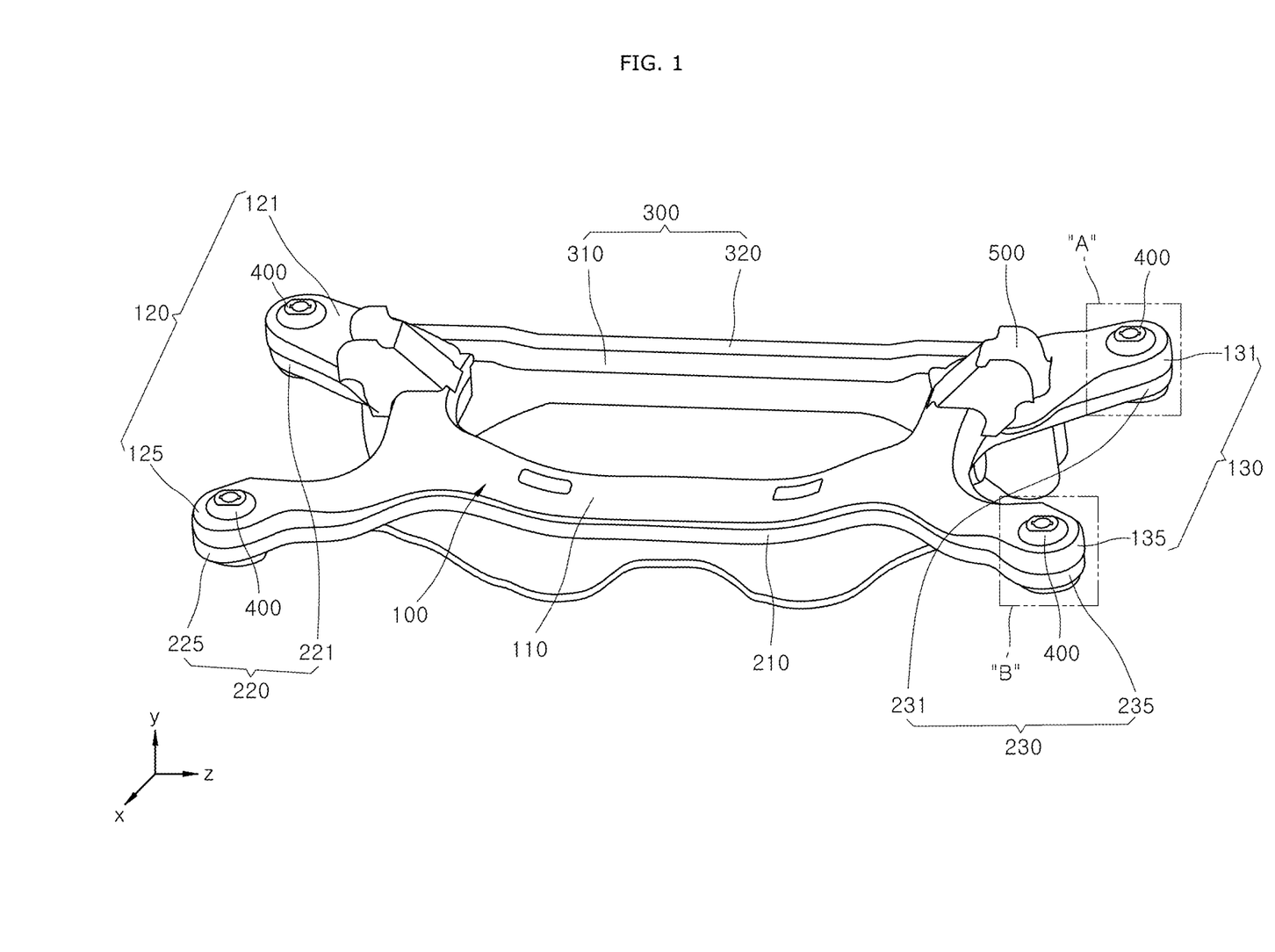
FIG. 1 is a perspective view schematically illustrating a rear cross member for a vehicle according to an embodiment of the present disclosure.
Figure 2:
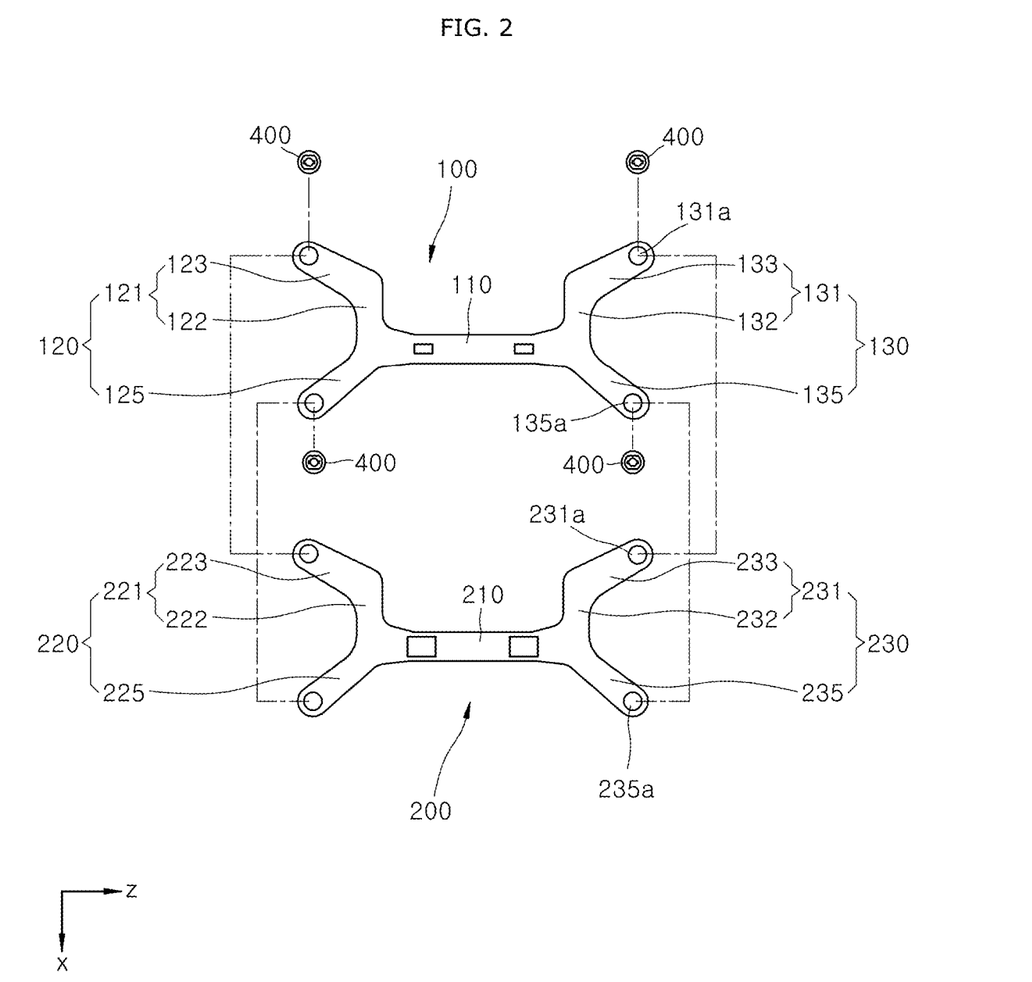
FIG. 2 is a top view schematically illustrating an upper plate and a lower plate in the rear cross member for a vehicle according to the embodiment of the present disclosure.
Figure 3:
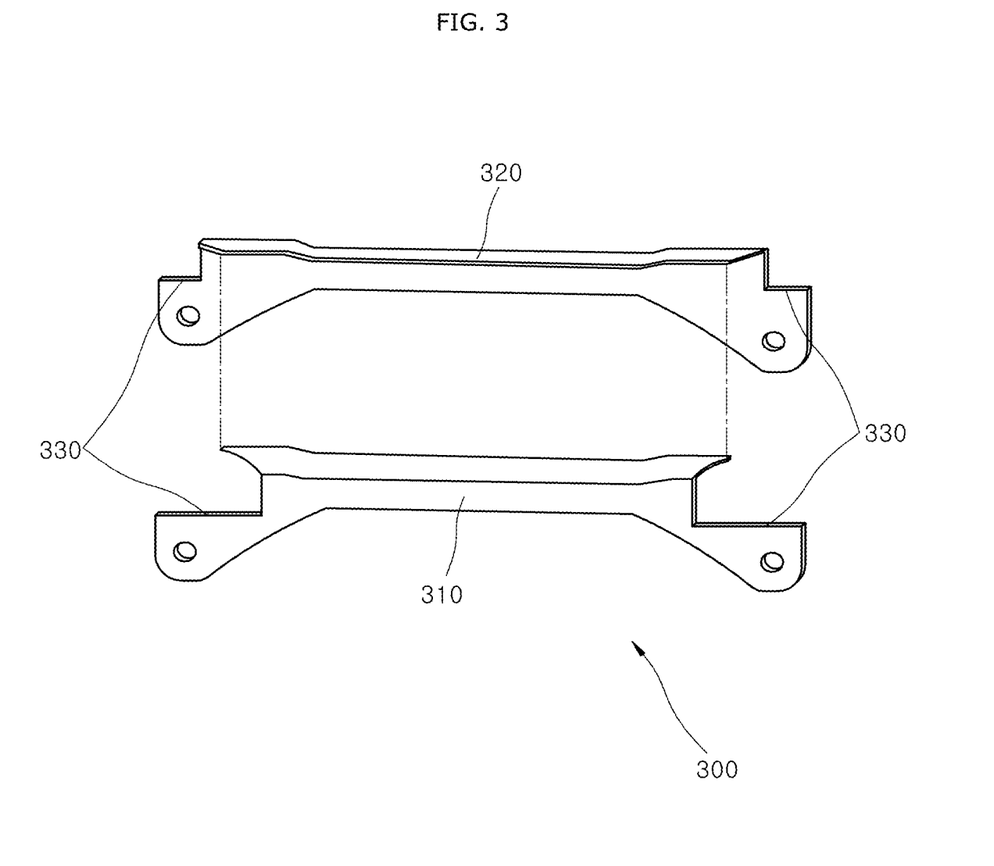
FIG. 3 is a perspective view schematically illustrating a front panel in the rear cross member for a vehicle according to the embodiment of the present disclosure.
Figure 4:
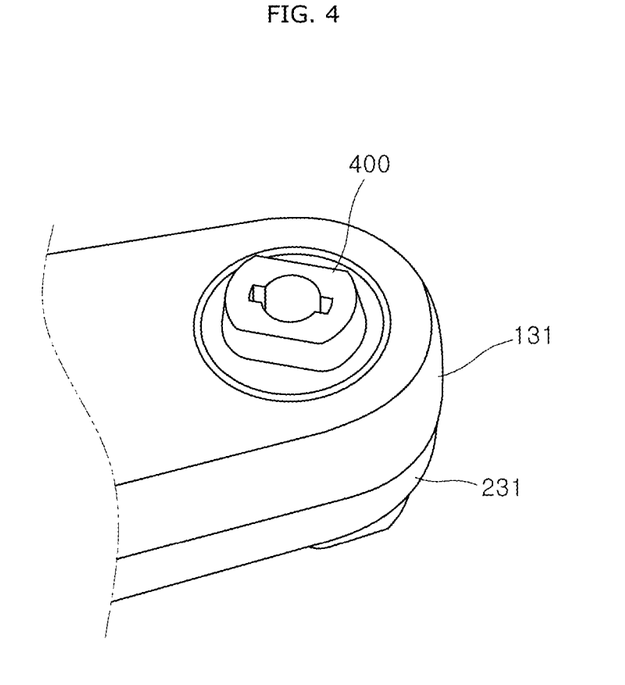
FIG. 4 is a partially enlarged view schematically illustrating "A" of FIG. 1.
Figure 5:
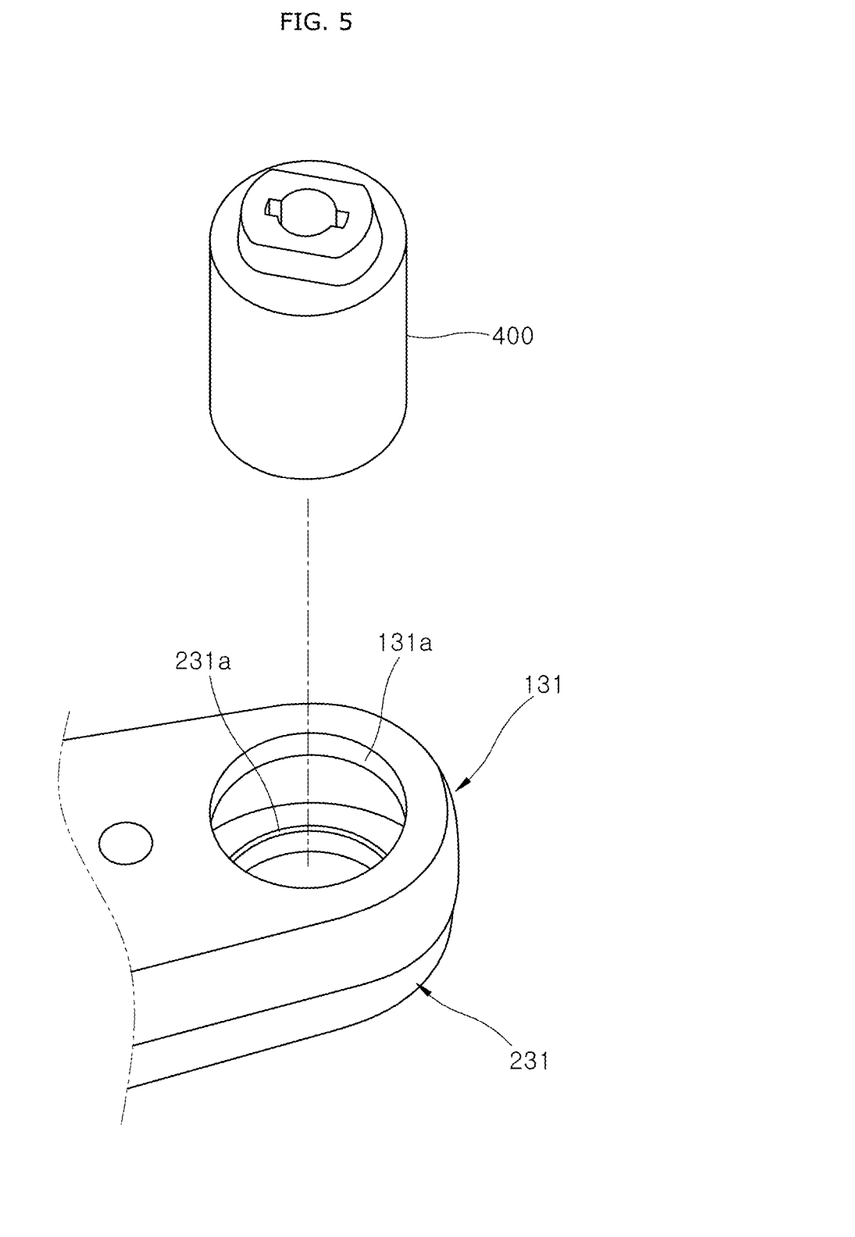
FIG. 5 is a perspective view schematically illustrating assembly of FIG. 4.
Figure 6:
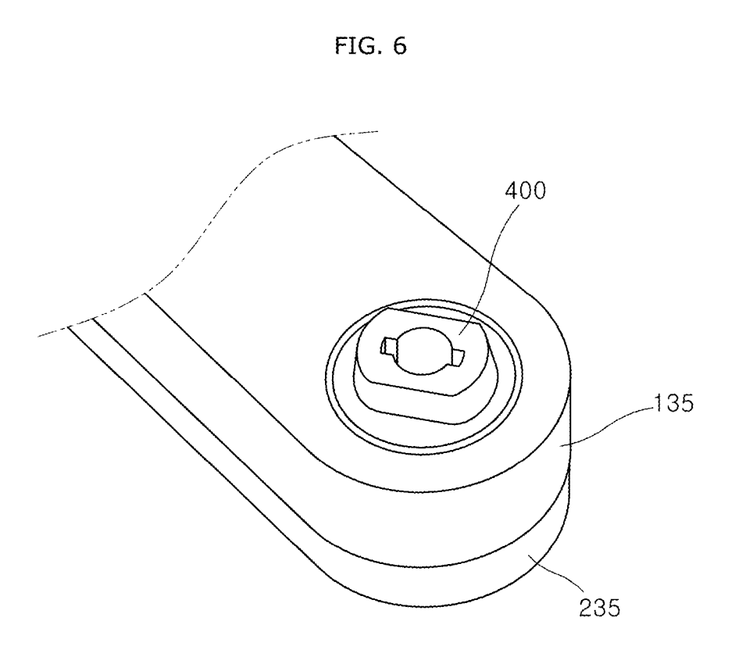
FIG. 6 is a partially enlarged view schematically illustrating "B" of FIG. 1.
Figure 7:
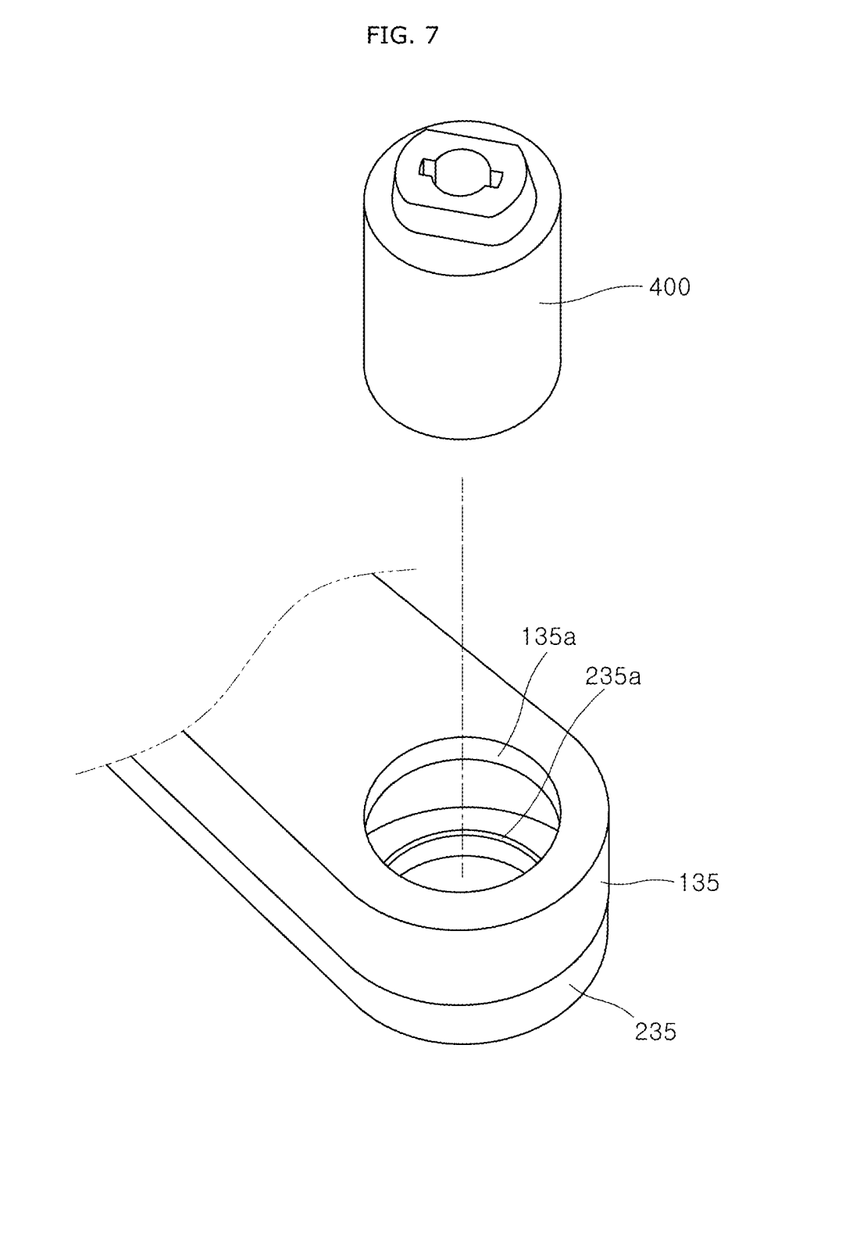
FIG. 7 is a perspective view schematically illustrating assembly of FIG. 6.
Figure 8:
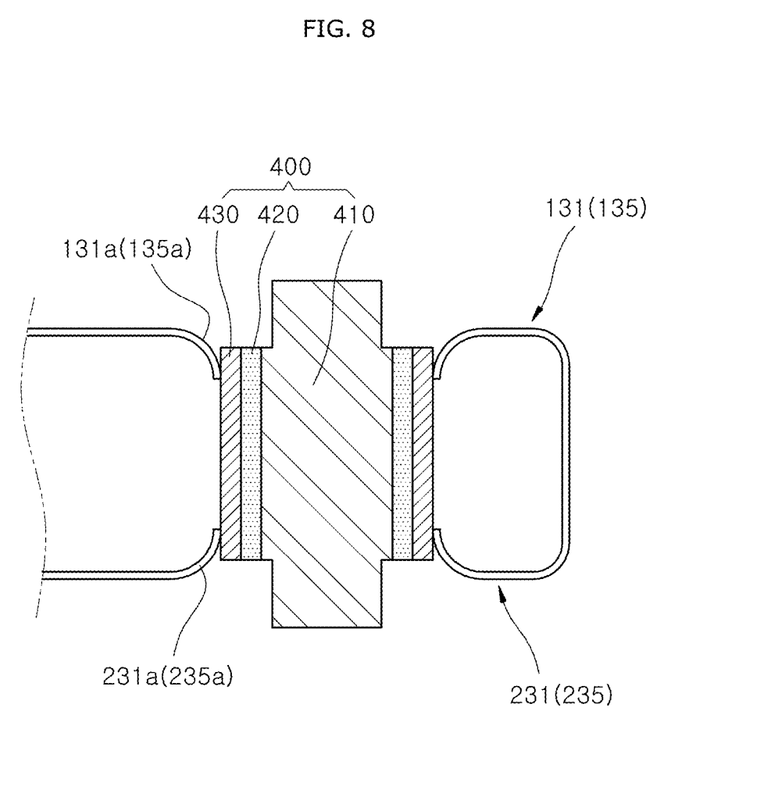
FIG. 8 is a sectional view schematically illustrating coupling of a boss according to an embodiment of the present disclosure.

FIG. 1 is a perspective view schematically illustrating a rear cross member for a vehicle according to an embodiment of the present disclosure. FIG. 2 is a top view schematically illustrating an upper plate and a lower plate in the rear cross member for a vehicle according to the embodiment of the present disclosure. FIG. 3 is a perspective view schematically illustrating a front panel in the rear cross member for a vehicle according to the embodiment of the present disclosure. FIG. 4 is a partially enlarged view schematically illustrating "A" of FIG. 1. FIG. 5 is a perspective view schematically illustrating assembly of FIG. 4. FIG. 6 is a partially enlarged view schematically illustrating "B" of FIG. 1. FIG. 7 is a perspective view schematically illustrating assembly of FIG. 6. FIG. 8 is a sectional view schematically illustrating coupling of a boss according to an embodiment of the present disclosure.

Referring to FIGS. 1 to 8, a rear cross member for a vehicle according to an embodiment of the present disclosure includes an upper plate 100, a lower plate 200, and a front panel 300.

The upper plate 100 includes an upper body 110 and upper side parts 120 and 130. The upper body 110 is formed in a linear bar shape. The upper side parts 120 and 130 are formed to extend from left and right opposite ends of the upper body 110.

The upper side parts 120 and 130 include a first upper side part 120 and a second upper side part 130. The first upper side part 120 is formed to extend forward and backward from one end (a left end based on FIG. 2) of the upper body 110. The first upper side part 120 and the second upper side part 130 are formed and disposed to be symmetrical to each other with respect to the upper body 110.

The first upper side part 120 includes a first upper front side part 121 and a first upper rear side part 125. The first upper front side part 121 is formed to extend forward (upward based on FIG. 2) from the upper body 110.

The first upper front side part 121 includes a first upper front protrusion 122 and a first upper front outer part 123. The first upper front protrusion 122 is formed to extend forward from the upper body 110. The first upper front outer part 123 is formed to extend from the first upper front protrusion 122 in a direction apart from the second upper side part 130 (the left direction based on FIG. 2).

The first upper rear side part 125 is formed to extend backward (downward based on FIG. 2) from the upper body 110. To be more specific, the first upper rear side part 125 is formed to extend from the upper body 110 in the direction apart from the second upper side part 130 (the left direction based on FIG. 2).

The second upper side part 130 includes a second upper front side part 131 and a second upper rear side part 135. The second upper front side part 131 is formed to extend forward (upward based on FIG. 2) from the upper body 110.

The second upper front side part 131 includes a second upper front protrusion 132 and a second upper front outer part 133. The second upper front protrusion 132 is formed to extend forward from the upper body 110. The second upper front outer part 133 is formed to extend from the second upper front protrusion 132 in a direction apart from the first upper side part 120 (the right direction based on FIG. 2).

The second upper rear side part 135 is formed to extend backward (downward based on FIG. 2) from the upper body 110. To be more specific, the second upper rear side part 135 is formed to extend from the upper body 110 in the direction apart from the first upper side part 120 (the right direction based on FIG. 2).

The lower plate 200 includes a lower body 210 and lower side parts 220 and 230. The lower body 210 is coupled with the upper body 110, and is formed in a linear bar shape. The lower side parts 220 and 230 are formed to extend from opposite ends of the lower body 210, and are coupled with the upper side parts 120 and 130.

The lower side parts 220 and 230 include a first lower side part 220 and a second lower side part 230. The first lower side part 220 is coupled to the first upper side part 120, and is formed to extend forward and backward from one end (a left end based on FIG. 2) of the lower body 210. The first lower side part 220 and the second lower side part 230 are formed and disposed to be symmetrical to each other with respect to the lower body 210.

The first lower side part 220 includes a first lower front side part 221 and a first lower rear side part 225. The first lower front side part 221 is coupled to the first upper front side part 121, and is formed to extend forward (upward based on FIG. 2) from the lower body 210.

The first lower front side part 221 includes a first lower front protrusion 222 and a first lower front outer part 223. The first lower front protrusion 222 is coupled to the first upper front protrusion, and is formed to extend forward from the lower body 210. The first lower front outer part 223 is formed to extend from the first lower front protrusion 222 in a direction apart from the second lower side part 230 (the left direction based on FIG. 2).

The first lower rear side part 225 is coupled to the first upper rear side part 125, and is formed to extend backward (downward based on FIG. 2) from the lower body 210. To be more specific, the first lower rear side part 225 is formed to extend from the lower body 210 in the direction apart from the second lower side part 230 (the left direction based on FIG. 2).

The second lower side part 230 includes a second lower front side part 231 and a second lower rear side part 235. The second lower front side part 231 is coupled to the second upper front side part, and is formed to extend forward (upward based on FIG. 2) from the lower body 210.

The second lower front side part 231 includes a second lower front protrusion 232 and a second lower front outer part 233. The second lower front protrusion 232 is coupled to the second upper front protrusion 132, and is formed to extend forward from the lower body 210. The second lower front outer part 233 is coupled to the second upper front outer part 133, and is formed to extend from the second lower front protrusion 232 in a direction apart from the first lower side part 220 (the right direction based on FIG. 2).

The second lower rear side part 235 is coupled to the second upper rear side part 135, and is formed to extend backward (downward based on FIG. 2) from the lower body 210. To be more specific, the second lower rear side part 235 is formed to extend from the lower body 210 in the direction apart from the first lower side part 220 (the right direction based on FIG. 2).

The front panel 300 is connected to the upper plate 100 and the lower plate 200. The front panel 300 includes a first front panel 310 and a second front panel 320. The first front panel 310 is coupled with the first and second upper side parts 120 and 130 that are included in the upper side parts 120 and 130, and the first and second lower side parts 220 and 230 that are included in the lower side parts 220 and 230. The first front panel 310 is coupled to the fronts of the upper side parts 120 and 130 and the lower side parts 220 and 230.

The second front panel 320 is coupled with the first front panel 310, and is coupled with the first and second upper side parts 120 and 130 that are included in the upper side parts 120 and 130, and the first and second lower side parts 220 and 230 that are included in the lower side parts 220 and 230. Like the first front panel 310, the second front panel 320 is coupled to the fronts of the upper side parts 120 and 130 and the lower side parts 220 and 230.

On the basis of FIG. 3, the first front panel 310 in the present disclosure is disposed close to the upper and lower bodies 110 and 210, and the second front panel 320 is disposed in a direction apart from the upper and lower bodies 110 and 210 relative to the first front panel 310.

The lower plate 200 is coupled on a lower side of the upper plate 100, and the second front panel 320 is coupled in front of the first front panel 310. That is, the upper plate 100 and the lower plate 200 in the present disclosure are coupled in one direction (a y direction based on FIG. 1), and the first front panel 310 and the second front panel 320 are coupled in the other direction (an x direction based on FIG. 1) intersecting the one direction (the y direction based on FIG. 1) in which the upper plate 100 and the lower plate 200 are coupled.

The upper plate 100 and the lower plate 200 are coupled in the one direction, and the first front panel 310 and the second front panel 320 are coupled in the other direction orthogonal to the one direction in which the upper plate 100 and the lower plate 200 are coupled, so that the coupled state stable from external shocks or the like in the upward/downward direction (the y direction based on FIG. 1) and the forward/backward direction (the x direction based on FIG. 1) can be maintained.

The first front panel 310 and the second front panel 320 are concavely formed to house the upper side parts 120 and 130 and the lower side parts 220 and 230, and include front panel fasteners 330 coupled with the upper side parts 120 and 130 and the lower side parts 220 and 230.

The front panel fasteners 330 are concavely formed, so that the first front panel 310 and the second front panel 320 can be easily mounted in the front panel 300 through the front panel fasteners 330.

In the present disclosure, the upper plate 100, the lower plate 200, and the front panel 300 are integrally coupled at portions that are in contact with one another by welding. The rear cross member for a vehicle according to the present disclosure is made up of the upper plate 100, the lower plate 200, and the front panel 300, so that assembly process and time can be reduced, and productivity can be improved.

In the present disclosure, the upper side parts 120 and 130 and the lower side parts 220 and 230 communicate with each other in the upward/downward direction, and bosses 400 are press-fitted into the upper side parts 120 and 130 and the lower side parts 220 and 230.

Upper front and rear through-holes 131a and 135a pass through the upper side parts 120 and 130, and lower front and rear through-holes 231a and 235a pass through the lower side parts 220 and 230.

The upper front through-hole 131a communicates with the lower front through-hole 231a, and the upper rear through-hole 135a communicates with the lower rear through-hole 235a. The bosses 400 are press-fitted into the upper and lower front through-holes 131a and 231a, and the upper and lower rear through-holes 135a and 235a, so that a coupling force between the upper plate 100 and the lower plate 200 is improved, and shocks transmitted from the outside can be absorbed.

The upper and lower front through-holes 131a and 231a, and the upper and lower rear through-holes 135a and 235a are formed to come into contact with outer surfaces of the bosses 400 by burring. The burring machines the upper and lower front through-holes 131a and 231a, and the upper and lower rear through-holes 135a and 235a to form inward extensions. The outer surfaces of the bosses 400 are press-fitted into the upper and lower front through-holes 131a and 231a, and the upper and lower rear through-holes 135a and 235a by burring, so that the bosses 400 can maintain an elastic relationship with the upper and lower front through-holes 131*a* and 231*a*, and the upper and lower rear through-holes 135*a* and 235*a*, and absorb transmitted shocks.

Referring to FIG. 8, each boss 400 includes a central shaft 410, an absorber 420, and an outer support 430. The central shafts 410 are inserted into the upper side parts 120 and 130 and the lower side parts 220 and 230. The central shaft 410 is formed in a cylindrical shape, and is disposed in the centers of the upper and lower front through-holes 131*a* and 231*a* or the upper and lower rear through-holes 135*a* and 235*a*.

The outer support 430 is disposed apart from the central shaft 410, and surrounds the central shaft 410. An outer surface of the outer support 430 is in contact with the upper and lower front through-holes 131*a* and 231*a* or the upper and lower rear through-holes 135*a* and 235*a*.

The absorber 420 is interposed between the central shaft 410 and the outer support 430, and absorbs shocks transmitted from the central shaft 410 or the outer support 430

The central shaft 410 and the outer support 430 are formed of a steel material, have set strength, and are firmly supported in the upper and lower front through-holes 131*a* and 231*a* or the upper and lower rear through-holes 135*a* and 235*a*.

The absorber 420 is formed of an elastically deformable material. In the present disclosure, the absorber 420 is formed of an elastically deformable material such as rubber, plastic, or the like, and absorbs the shocks transmitted from the central shaft 410 or the outer support 430.

According to the rear cross member for a vehicle of the present disclosure, the number of coupling components of the rear cross member for a vehicle is reduced, so that a process can be simplified, and productivity can be improved.

Further, according to the present disclosure, the upper plate, the lower plate, and the front panel form an integrated structure, so that durability can be improved compared to the case where they form a multi-component structure.

Although preferred embodiments of the disclosure have been disclosed for illustrative purposes, those skilled in the art will appreciate that various modifications, additions and substitutions are possible, without departing from the scope and spirit of the disclosure as defined in the accompanying claims.

What is claimed is:

1. A rear cross member for a vehicle comprising:
   an upper plate including an upper body, and upper side parts that are formed to extend from opposite ends of the upper body;
   a lower plate including a lower body that is coupled with the upper body, and lower side parts that are formed to extend from opposite ends of the lower body and are coupled with the upper side parts; and
   a front panel connected to the upper plate and the lower plate,
   wherein:
   the upper side parts include
      a first upper side part that is formed to extend forward and backward from one end of the upper body, and
      a second upper side part that is formed to extend forward and backward from the other end of the upper body; and
   the lower side parts include
      a first lower side part that is coupled to the first upper side part and is formed to extend forward and backward from one end of the lower body, and
      a second lower side part that is coupled to the second upper side part and is formed to extend forward and backward from the other end of the lower body.

2. The rear cross member for a vehicle according to claim 1, wherein:
   the first upper side part includes
      a first upper front side part that is formed to extend forward from the upper body, and
      a first upper rear side part that is formed to extend backward from the upper body; and
   the first lower side part includes
      a first lower front side part that is coupled to the first upper front side part and is formed to extend forward from the lower body, and
      a first lower rear side part that is coupled to the first upper rear side part and is formed to extend backward from the lower body.

3. The rear cross member for a vehicle according to claim 2, wherein:
   the first upper front side part includes
      a first upper front protrusion that is formed to extend forward from the upper body, and
      a first upper front outer part that is formed to extend from the first upper front protrusion in a direction apart from the second upper side part; and
   the first lower front side part includes
      a first lower front protrusion that is coupled to the first upper front protrusion and is formed to extend forward from the lower body, and
      a first lower front outer part that is coupled to the first upper front outer part and is formed to extend from the first lower front protrusion in a direction apart from the second lower side part.

4. The rear cross member for a vehicle according to claim 2, wherein:
   the first upper rear side part is formed to extend from the upper body in the direction apart from the second upper side part; and
   the first lower rear side part is formed to extend from the lower body in the direction apart from the second lower side part.

5. The rear cross member for a vehicle according to claim 1, wherein:
   the second upper side part includes
      a second upper front side part that is formed to extend forward from the upper body, and
      a second upper rear side part that is formed to extend backward from the upper body; and
   the second lower side part includes a second lower front side part that is coupled to the second upper front side part and is formed to extend forward from the lower body, and
      a second lower rear side part that is coupled to the second upper rear side part and is formed to extend backward from the lower body.

6. The rear cross member for a vehicle according to claim 5, wherein:
   the second upper front side part includes
      a second upper front protrusion that is formed to extend forward from the upper body, and
      a second upper front outer part that is formed to extend from the second upper front protrusion in a direction apart from the first upper side part; and
   the second lower front side part includes
      a second lower front protrusion that is coupled to the second upper front protrusion and is formed to extend forward from the lower body, and
      a second lower front outer part that is coupled to the second upper front outer part and is formed to extend from the second lower front protrusion in a direction apart from the first lower side part.

7. The rear cross member for a vehicle according to claim 5, wherein:
the second upper rear side part is formed to extend from the upper body in the direction apart from the first upper side part; and
the second lower rear side part is formed to extend from the lower body in the direction apart from the first lower side part.

8. The rear cross member for a vehicle according to claim 1, wherein the front panel includes:
a first front panel that is coupled to fronts of the upper and lower side parts; and
a second front panel that is coupled to the first front panel and is coupled to the upper and lower side parts.

9. The rear cross member for a vehicle according to claim 8, wherein:
the lower plate is coupled on a lower side of the upper plate; and
the second front panel is coupled in front of the first front panel.

10. The rear cross member for a vehicle according to claim 8, wherein the first and second front panels are concavely formed to house the upper and lower side parts, and include front panel fasteners coupled with the upper and lower side parts.

11. The rear cross member for a vehicle according to claim 1, wherein:
the upper and lower side parts communicate with each other; and
bosses are press-fitted into the upper and lower side parts.

12. The rear cross member for a vehicle according to claim 11, wherein the upper and lower side parts are formed to come into contact with outer surfaces of the bosses by burring.

13. The rear cross member for a vehicle according to claim 11, wherein each boss includes:
a central shaft;
an outer support that is disposed apart from the central shaft; and
an absorber that is interposed between the central shaft and the outer support and absorbs shocks transmitted from the central shaft or the outer support.

14. The rear cross member for a vehicle according to claim 13, wherein:
the central shaft and the outer support are formed of a steel material; and
the absorber is formed of an elastically deformable material.

15. A rear cross member for a vehicle comprising:
an upper plate including an upper body, and upper side parts that are formed to extend from opposite ends of the upper body;
a lower plate including a lower body that is coupled with the upper body, and lower side parts that are formed to extend from opposite ends of the lower body and are coupled with the upper side parts; and
a front panel connected to the upper plate and the lower plate,
wherein:
the front panel includes:
a first front panel that is coupled to fronts of the upper and lower side parts; and
a second front panel that is coupled to the first front panel and is coupled to the upper and lower side parts, and
the first and second front panels are concavely formed to house the upper and lower side parts, and include front panel fasteners coupled with the upper and lower side parts.

16. A rear cross member for a vehicle comprising:
an upper plate including an upper body, and upper side parts that are formed to extend from opposite ends of the upper body;
a lower plate including a lower body that is coupled with the upper body, and lower side parts that are formed to extend from opposite ends of the lower body and are coupled with the upper side parts; and
a front panel connected to the upper plate and the lower plate,
wherein:
the upper and lower side parts communicate with each other,
bosses are press-fitted into the upper and lower side parts, and
the upper and lower side parts are formed to come into contact with outer surfaces of the bosses by burring.

* * * * *